(12) United States Patent  (10) Patent No.: US 6,748,402 B1
Reeves et al.  (45) Date of Patent: Jun. 8, 2004

(54) SYSTEM AND METHOD FOR CONVERTING AND LOADING INTERACTIVE PAGER ADDRESS BOOKS (75) Inventors: Jon Reeves, Roswell, GA (US); Karla Reeves, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 222 days.

(21) Appl. No.: 09/822,317

(22) Filed: Apr. 2, 2001

(51) Int. Cl.[7] .............................................. G06F 17/30
(52) U.S. Cl. ............................ 707/201; 707/4; 707/204
(58) Field of Search ........................ 707/3, 104.1, 201, 707/202, 204, 4

(56) References Cited

U.S. PATENT DOCUMENTS

| | | | | | |
|---|---|---|---|---|---|
| 5,701,423 | A | * | 12/1997 | Crozier ........................ 707/102 |
| 5,884,323 | A | * | 3/1999 | Hawkins et al. ............. 707/201 |
| 5,930,818 | A | * | 7/1999 | Suu et al. .................... 711/115 |
| 6,073,138 | A | * | 6/2000 | de l'Etraz et al. ........ 707/104.1 |
| 6,088,706 | A | * | 7/2000 | Hild ............................ 707/202 |
| 6,199,104 | B1 | * | 3/2001 | Delph ......................... 709/208 |
| 6,275,831 | B1 | * | 8/2001 | Bodnar et al. .............. 707/201 |
| 6,324,544 | B1 | * | 11/2001 | Alam et al. ................. 707/201 |
| 6,374,259 | B1 | * | 4/2002 | Celik ....................... 707/104.1 |
| 6,393,434 | B1 | * | 5/2002 | Huang et al. ............... 707/200 |
| 6,442,570 | B1 | * | 8/2002 | Wu ............................. 707/201 |
| 6,493,727 | B1 | * | 12/2002 | Huang et al. ............... 707/201 |
| 6,636,873 | B1 | * | 10/2003 | Carini et al. ................ 707/201 |
| 2001/0034728 | A1 | * | 10/2001 | McBride et al. ................ 707/1 |
| 2002/0013815 | A1 | * | 1/2002 | Obradovich et al. ........ 709/204 |
| 2002/0016809 | A1 | * | 2/2002 | Foulger et al. ............. 709/102 |
| 2002/0041605 | A1 | * | 4/2002 | Benussi et al. ............. 370/467 |
| 2002/0083201 | A1 | * | 6/2002 | Iyengar et al. .............. 709/246 |
| 2002/0103779 | A1 | * | 8/2002 | Ricart et al. ..................... 707/1 |
| 2002/0107807 | A1 | * | 8/2002 | Ketonen et al. ............... 705/51 |
| 2002/0145624 | A1 | * | 10/2002 | Szlam et al. ................. 345/738 |
| 2002/0184199 | A1 | * | 12/2002 | Celik ............................. 707/3 |

OTHER PUBLICATIONS

"Inter@ctive Pager Backup–Restore Utility", Version 1.0 for Mobitex (1999).
"LFA Conversion Tool" (Nov. 2000).
Load "Dot Com Employee Help" (Oct. 2000).

* cited by examiner

Primary Examiner—Jean M. Corrielus
Assistant Examiner—Monplaisir G. Hamilton
(74) Attorney, Agent, or Firm—Shaw Pittman LLP (57) ABSTRACT A conversion tool inputs an address book downloaded from an interactive pager executing an operating system that is not compatible with personal information managers. The conversion tool outputs a user database in a format compatible with a target personal information manager. The conversion tool analyzes each record of contact information in the address book information file to determine the corresponding field of the target personal information manager. If there is no corresponding field in the personal information manager, the conversion tool places the record in a default field in the target personal information manager. The determination is made on the basis of a pre-determined mapping of field names from the address book information file to the target personal information manager. The user database is merged with a corporate database in a personal information manager contacts list database. The personal information manager contacts list database is uploaded to an interactive pager that is compatible with the personal information manager.

35 Claims, 5 Drawing Sheets

SYSTEM AND METHOD FOR CONVERTING AND LOADING INTERACTIVE PAGER ADDRESS BOOKS

BACKGROUND

1. Field of Invention

The present invention relates generally to the field of interactive paging devices. More specifically, the present invention relates to the field of enabling users to use existing address books in interactive pagers having software upgrades allowing synchronization with personal information managers.

2. Background of the Invention

Personal information managers are well-known, and used in many contexts including maintaining personal and corporate-wide contact information. Such personal information mangers include Microsoft, Outlook, Lotus Notes, Goldmine, ACT and others. Contact information is generally kept in address books. The contact information includes names, addresses, phone numbers, email addresses, fax numbers, pager numbers, street addresses and other contact information. There are often multiple pieces of information for each category of information. For example, phone numbers can include one or more home phone numbers, one or more business numbers and other phone numbers. Likewise, email addresses can include a plurality of email addresses. In addition, many address books provide users with the option of storing notes related to the address book entry. The notes are a text field into which the user can enter any information the user desires related to the address book entry.

Certain prior art interactive pagers were not compatible with personal information managers. There are a number of reasons such prior art interactive pagers could be incompatible with personal information managers, including (1) the interactive pager could not execute an operating system compatible with the personal information manager and (2) the interactive pager could operate such an operating system, but had not been upgraded with such an operating system. These prior art pagers could not be data synchronized with the information that is kept or updated by the personal information manager. With the proliferation of personal information managers to keep contact information, this is a significant drawback.

Consequently, a new operating system was developed that is compatible with such personal information managers. This resulted in several compatibility problems with prior art pagers. In fact, some prior art interactive pagers could not be upgraded to execute the new operating system due to memory constraints.

Interactive pagers that could be upgraded to the new operating system were usually upgraded by "flashing" the old operating system with the new operating system. "Flashing" is essentially an in-place substitution of the new operating system for the old operating system. However, the formats between the address books in the old operating system and the new operating system were not compatible. For example, if a user had multiple entries for a field (such as phone numbers or email addresses), the conversion software lost data and did not work consistently. Consequently, the user could lose much of the contact information in the address book data. The user had to reenter the lost data manually.

A primary reason for the data loss was that during the conversion, the pager could only provide general information regarding contact information. For example, an interactive pager might be able to hold up to three entries for each field (e.g., three phone numbers). However, it would identify all three entries by a single field or tag name. For example, three phone numbers would each be identified by the field name "PHONE". Consequently, the conversion software did not know which field name corresponded to a particular field, for example, which value was the business phone number and which value was the home telephone number. This deficiency was true for any field that could have multiple values, including, for example, email address, phone number, pager number, fax number and others.

This posed a significant problem because the new operating system was developed to the interface with personal information managers. Personal information managers provide separate field names for like fields. For example, the field associated with the tag "PHONE" can hold home phone numbers, business phone numbers, cell phone numbers, assistant's phone numbers and other phone numbers. However, because conventional conversion software did not know which of the several phone numbers or email addresses corresponded to the home, business or other entity, it simply stored the first phone number or email address it found as the business phone number entry or business email entry respectively in the personal information manager it was interfacing with. The remaining information was discarded. Not only did this technique result in the loss of information, i.e., it is a "lossy" technique, but it often resulted in wrong information being put in particular fields. For example, often the home phone number could be put in the business phone number field, while the business phone number was discarded.

For prior art interactive pagers that could not handle the new operating system, the user had to get a new pager to be able to synchronize with personal information managers. However, there was no mechanism for taking an address book from the old interactive pager and installing it on the new pager. The user could backup the address book in the interactive pager by downloading it to a computer disk. However, the user could not conveniently transfer the address book from the computer disk to an interactive pager with the new operating system. The only way to transfer the address book data was to manually reenter it into the new address book.

Manual reentry situation imposes inconvenience even in the case where the user has only a few addresses. However, most users carry hundreds of names and corresponding address information. The address information includes email addresses, pager addresses, street addresses, home, office, and other telephone numbers, fax telephone numbers, company information, and other contact information including notes for the individuals contained in the address book. Having to replace this information manually is often a thankless task that is highly prone to human error.

The inability to transfer address books easily also manifests itself in the maintenance context. For example, if an interactive pager breaks or can no longer be used for some reason it must be replaced. Generally, the old interactive pager is replaced with a new interactive pager having the new operating system. The address book from the old interactive pager must be transferred to the new interactive pager. If the old interactive pager did not have a compatible address book, the user could lose much of her contact information and have to reenter it manually. Some problems with manual reentry of the address book data have been discussed above.

Another consideration is for companies that maintain a central database of common contact information, for example, contact information regarding the other intracompany users. This kind of database is referred to as a master address book or corporate master address book. Many such corporate master address books are not compatible with personal information managers. Those that are compatible, are not compatible with interactive pagers executing the old operating system.

SUMMARY OF THE INVENTION

The present invention solves the problems in the art by using a lossless conversion tool to convert an address book information file into a user database that is compatible with a target personal information manager. A lossless conversion does not discard any contact information (other than duplicate information) in the interactive pager address book. Thus, the conversion routine of the present invention does not discard subsequent phone numbers, email addresses or other data.

The present invention allows a user to merge their individual address book and a corporate master together and load it into a personal data manager, such as Outlook, and ultimately to an interactive pager. Thus, the user then has both her personal information and any corporate-wide information available in the interactive pager.

In one embodiment of the present invention, an address book is downloaded from an interactive pager and stored in an address book information file. A conversion tool inputs the address book information file and outputs a user database in a format compatible with a target personal information manager. In addition, the conversion tool analyzes each record of contact information in the address book information file to determine the corresponding field of the target personal information manager. If there is no corresponding field in the personal information manager, the conversion tool places the record in a default field in the target personal information manager. The determination is made on the basis of a pre-determined mapping of field names from the address book information file to the target personal information manager.

The user database is merged with a corporate master database in a personal information manager contacts list database. The personal information manager contacts list database is uploaded to the user's interactive pager. The user's interactive pager is running an operating system compatible with the personal information manager. Consequently, the user's contact information is synchronized with the personal information manager contacts list database.

The present invention are described in greater detail in the detailed description of the invention, the appended drawings and the attached claims.

DETAILED DESCRIPTION OF THE PREFERRED EMBODIMENTS

Figure 1:
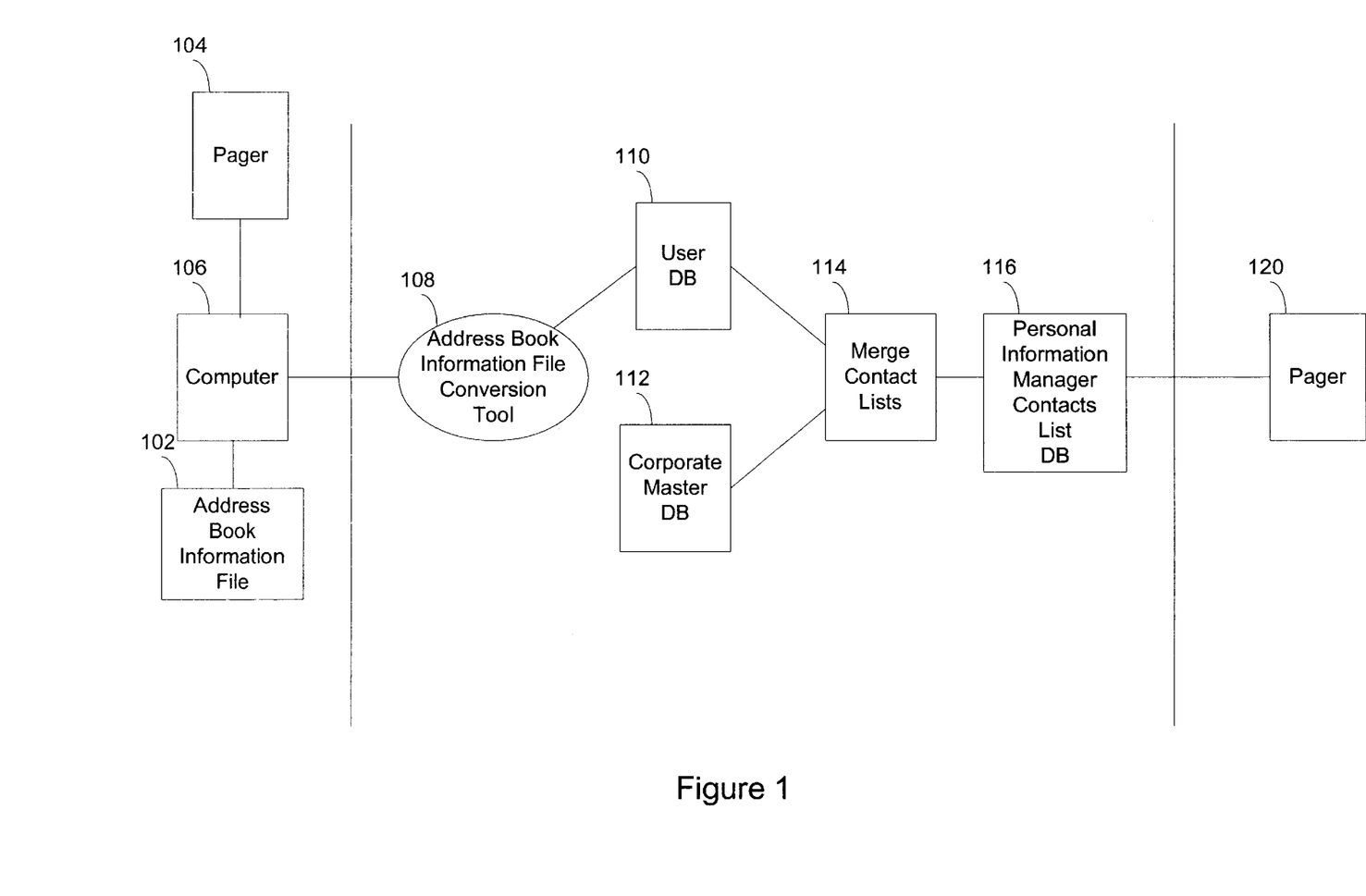
FIG. 1 is a schematic diagram of a system for converting an address book information file to a format that can be used with interactive pagers having an operating system that enables data synchronization with database files of personal information managers according to an embodiment of the present invention.

FIG. 1 is a schematic diagram of a system for converting an address book information file to a format that can be used with interactive pagers having an operating system that enables data synchronization with database files of personal information managers. The personal information manager for which the data is converted is termed the "target" personal information manager. Personal information managers that can be used with the present invention include: Microsoft, Outlook, Lotus Notes, Goldmine, ACT and others. The present invention is used to convert an address book from an old interactive pager or a new interactive pager using an old operating system that did not allow data synchronization with a personal information manager.

An address book information file 102 is created. Address book information file 102 contains the contact information that is on a pager 104. Neither address book information file 102 nor pager 104 is compatible with a personal information manager. Address book information file 102 is created by connecting a pager 104 to a computer 106. The address book information from pager 104 is downloaded and stored in address book information file 102. The download can be performed using software supplied by a pager manufacturer. Exemplary software is the Inter@ctive Pager Backup-Restore Utility software provided by Research In Motion, Ltd. (RIM) for its pagers. Information regarding this utility can be found in the "Inter@active Pager Backup-Restore Utility" User guide, which is hereby incorporated by reference herein in its entirety. This software creates a .LFA file. The .LFA file is an exemplary address information file 102.

The .LFA file is a flat database file that containing variable-length contact information records. Each contact information record is a name-tag-value data record. The name is the name of the person or entity to which the contact information applies. The tag is a field name such as "PHONE," "EMAIL," "ADDRESS" or other contact information field names. The value is the value of the tag for this particular contact information. There can be multiple tags and values for a particular name. An exemplary contact information record is "'John Doe', 'Email', 'john.doe@company.com', 'Email', 'john.doe@home.com', 'Fax', '404-123-4567'". This record provides two email addresses and a fax number for John Doe.

Address book information file 102 is input to an address book information conversion tool 108. Address book information file conversion tool 108 takes address book information file 102 and stores the contact information contained in it in a user database 110 in a database system. User database 110 is compatible with a personal information manager. An exemplary database system is the well known Microsoft OUTLOOK database system. Importantly, address book information conversion tool 108 extracts all of the information from pager 104 and stores all of the information from pager 104 in user database 110. All of the information is stored without loss. Some compression is allowable because redundant and inconsistent data is preferably discarded. However, discarding redundant data and inconsistent data does not result in the loss of any information. The contact information in address book information file 102 can be distinct for each user. Thus, users can maintain their own contact information.

The information in database 110 can be in addition to, or in lieu of corporate information contained in a corporate master database 112. Corporate master database 112 is compatible with a personal information manager. Corporate master database 112 is a central database containing corporate address book information. In an embodiment of the present invention, the corporate information is contact information of general interest to the entire corporate entity, including for example, contact information for each employee of the corporation.

The information in user database 110 and corporate master database 112 can be different for the same contact. There are a number of reasons for this. For example, a user may have additional, or more recent, contact information for a particular contact. Furthermore, a user can have additional contact information for contacts that are not included in corporate master database 112.

A merge contact lists process 114 handles this disparate information. Merge contact lists process 114 merges the contact information in user database 110 with the contact information in corporate master database 112. In one embodiment of the present invention, the merge is performed at the field level.

Figure 2:
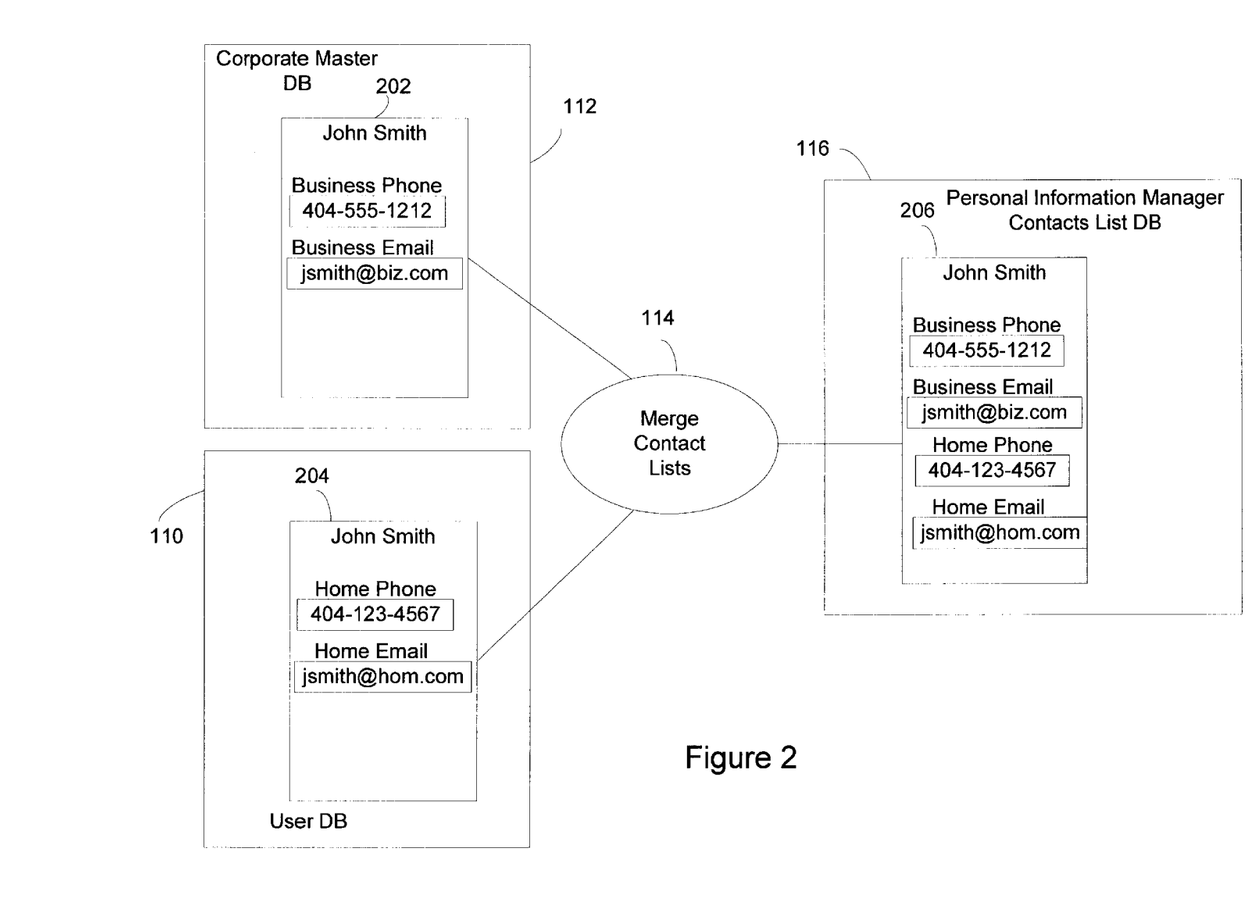
FIG. 2 is a schematic illustration of field level merging according to an embodiment of the present invention.

Field level merging is explained with reference to FIG. 2. A contact information record 202 for John Smith in corporate master database 112 contains John Smith's business phone number and business email address. In addition, a contact information record 204 for John Smith in user database 110 contains John Smith's home phone number and personal email address. Contact record 204 resulted from a prior download from interactive pager 104. Simply using one or the other of contact information records 202 and 204 would lose either John Smith's business or home information. Merge contact lists process 114 handles this problem by merging the data to produce a merged contact information record 206 in a personal information manager contacts list database 116. That is merge contacts lists process 114 synchronizes the data in user database 110 and corporate master database 112.

Personal information manager contacts list database 116 contains contact information records that are used by a target personal information manager. The target personal information manager is the personal information manager having the format to which conversion tool 108 converts the data. Because the new operating system has been upgraded for compatibility with the personal information manager, the contact information from pager 102 can now be uploaded to a pager 120 that executes the new operating system.

Corporate master database 112 is the controlling database. If the contact information for a particular name differs between corporate master database 112 and user database 110, the data in corporate master database 112 takes precedent. Conversion tool 108 disregards the different contact information in user database 110 for a particular name. Thus, the user's pager is updated with the most current corporate database information. One consequence of this is that user updates of information that is in the corporate database can be lost if the user does not update the corporate database through established procedures.

In an alternate embodiment of the present invention, contact information in user database 110 has priority over contact information in corporate database 112. In this manner, users keep the current information for contacts that they update in their pagers. One consequence is that the user's updates are not reflected in the corporate database. Furthermore, in systems providing date and time information to amendments of contact information in pager 104 and corporate master database 112, merge contact lists process 114 can choose the most recent entry for a given record of contact information.

The present invention can be used where there is no corporate master database 112. In this case, the only input to merge contact lists process 114 is the user database 110. Merge contact lists process 114 updates personal information manager contact list database 116 with the user contact list information from user database 110. That information can then be uploaded to a pager 120 that executes the new operating system. Importantly, all of the information is uploaded without loss. This is because all of the information can be stored in personal information manager contact lists database 116. On the upload side, the pager synchronization software can handle the multiple entries for each field. Only redundant or inconsistent contact information is discarded.

In an embodiment of the present invention, both user database 110 and corporate database 112 are in a format that is compatible with the target personal information management system. Thus merge contact lists process 114 simply merges the data as described above. No reformatting is required by merge process 114.

Merge contact lists process 114 is a two-step process. First, records from user database 110 are incorporated into personal manager contacts list 116. Second, merge contact lists process 114 incorporates corporate master database 112 into personal information manager contact list database 116. Duplicative records are skipped. Inconsistent records are replaced. As described above, merge process 114 operates at the field level. Thus, if a field entry already exists with identical information, that field is skipped.

Conversion tool 108 can differentiate between entries in fields that can have multiple field entries. For example, conversion tool 108 can differentiate a home phone number from a business phone number in the PHONE field. Another example is the ability of conversion tool 108 to differentiate between work email, personal email and interactive pager addresses.

Figure 3:
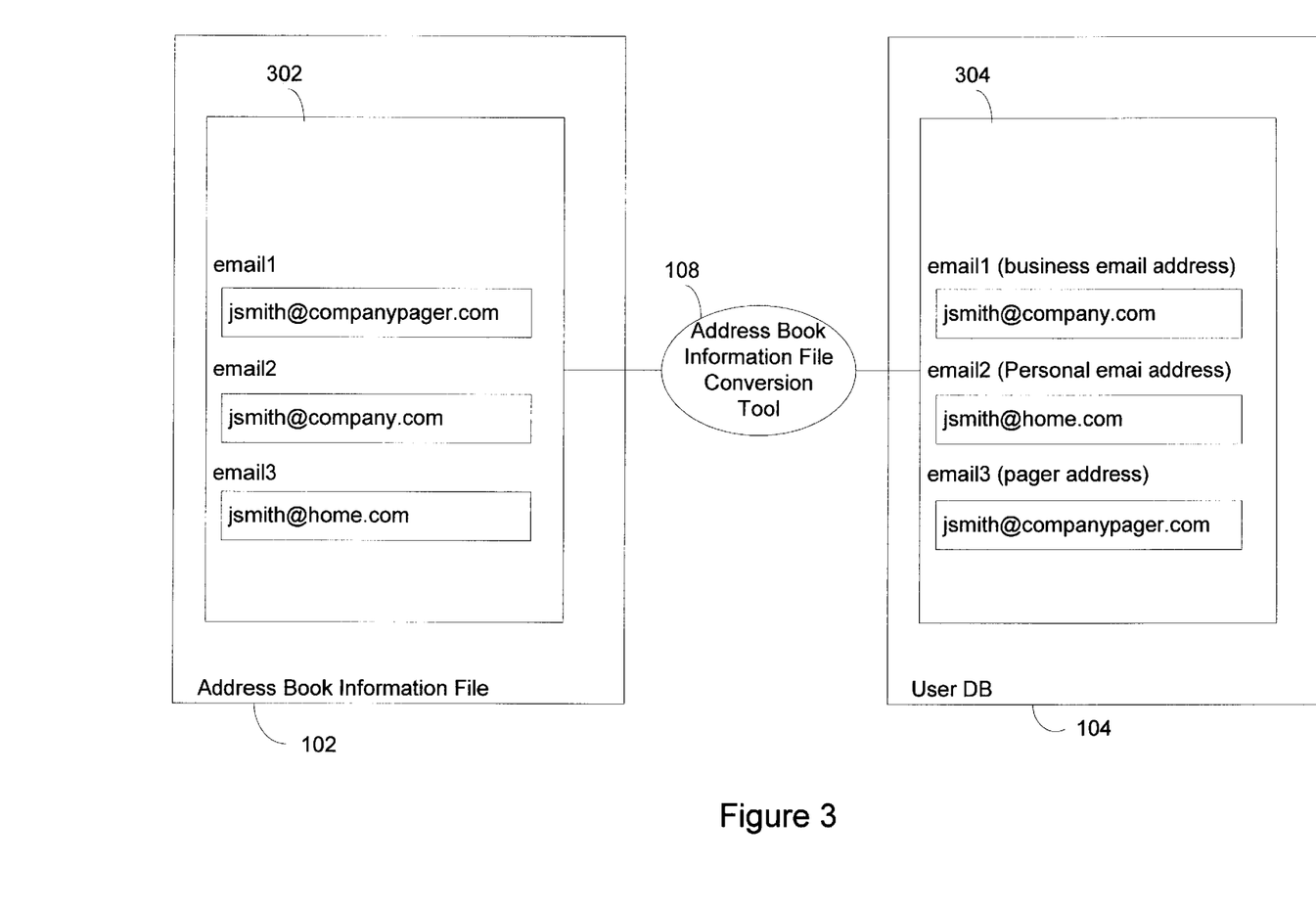
FIG. 3 is a schematic illustration of target personal information manager field determinations according to an embodiment of the present invention.

This is done on the basis of a priori information. During conversion, conversion tool 108 analyzes each piece of contact information for clues as to where it should be placed. An exemplary conversion for an exemplary email field is illustrated in FIG. 3. An email record 302 of address book information file 102 is populated with fields as illustrated. The EMAIL1 field contains the user's pager address, and has the value "jsmith@pager.com". The EMAIL2 field contains the user's business email address, and has the value "jsmith@company.com". The EMAIL3 field contains the user's personal email address, and has the value "jsmith@home.com".

Conversion tool 108 analyzes each of the email addresses to determine where it should be stored in the user database 104, i.e., the proper field in a personal information management system contact list file. This is generally determined a priori. For example, it is pre-determined that business email addresses are stored in the EMAIL1 field, personal addresses are stored in the EMAIL2 field and pager addresses are stored in the EMAIL3 field. Conversion tool 108 also is configured to associate an email address having a "company.com" extension as a business email address; an email address having a "home.com" extension as a personal email address; and an email address having a "pager.com" extension as a pager address. During the conversion, conversion tool 108 analyzes each email address and places it in the appropriate field in the user database 104. Thus, conversion tool 108 places "jsmit@pager.com" in the EMAIL3 field. Conversion tool 108 places "jsmith@company.com" in the EMAIL1 field. Conversion tool 108 places "jsmith@home.com" in the EMAIL2 field. It would be apparent to those skilled in the art that the foregoing is just one example of pre-determined mapping of contact information to personal information management system file fields and that, in general, pre-determined mapping of contact information to personal information management system file fields is implementation dependent.

Similarly, pre-determined mapping of telephone numbers can be made. For example, a company may have its own NPA-NXX. So, for example, any phone number beginning "404-249" can be designated as a company telephone number and stored in field PHONE1 field. The user may have only one other number for a particular contact. That number can be assumed to be a home number and stored in a HOME2 field. Similar assumptions can be made for other numbers. In like manner, other fields can have pre-determined mappings that map fields from address book information file 102 to a personal information manager database such as user database 104. In an alternative embodiment of the present invention, no assumptions are made about extra information.

The mappings can be kept in a database that is accessed by conversion tool 108. For example, the mappings can be stored in a mapping table. This allows conversion tool 108 to be implemented without hardcoded mappings. For example, conversion tool 108 can read the mappings from a mapping file during an initialization phase. Conversion tool 108 uses the mappings to create user database 110. This allows users and others to provide mappings. For example, conversion can be customized to a particular user.

If conversion tool 108 analyzes a particular field but cannot identify a corresponding field into which to place the information, i.e., there is no one-to-one mapping pre-defined for the field that was read, conversion tool 108 puts it into a DEFAULT field. The DEFAULT field can be a free-form text field such as the NOTES field in Microsoft Outlook. The data is date- and time-stamped as the record is added or updated. Conversion tool 108 also places a prefix, or tag, in the DEFAULT field to identify the particular field from which the data came. For example, an unknown phone number would have the prefix PHONE indicating that the data came from a PHONE field. One way to put the prefix in is to put an date- and time-stamped entry "PHONE=202-555-1212" in the DEFAULT field.

The DEFAULT field can also be used if conversion toll 108 determines more than one entry corresponds to a particular field. For example, if a user has two business phone numbers for a particular contact, conversion tool 108 places the first business number in the PHONE1 (business phone number) field. The second business phone number is date- and time-stamped and placed in the DEFAULT field, with an entry such as,"PHONE=404-555-1212", where 404-555-1212 is the contact's second business telephone number.

The DEFAULT field can also be used for any other information that is not provided for expresssly in conversion tool 108. Thus, any free text notes that are present can be placed in the DEFAULT field with prefix and date- and time-stamps.

Many personal information managers, such as Microsoft Outlook, allow users to identify which records have default fields (for example, the NOTES field in Microsoft Outlook) that have information in them. Users can then go to those fields, and cut-and-paste the information in the right place using a graphical user interface supplied by the personal information manager manufacturer.

Users can modify contact information in their pager. Alternately, a user can modify contact information by modifying contact information data in a computer file. One computer file is the file used by the personal information manager. The corporate master can be updated in general only by a system administrator. Users can update only their own records in the corporate master. The corporate master is protected against unauthorized access, for example, by well-known password access mechanisms.

In an embodiment of the present invention, conversion tool 108 discards duplicate contact information. That is, conversion tool 108 performs a lossless compression by only keeping one version of each unique piece of contact information. In addition, inconsistent contact information can be replaced. For example, in one embodiment of the present invention, contact information differing from the corporate master database is replaced by the contact information in the corporate master database.

Logging data can be kept to keep track of changes to user and corporate databases. This logging data can include date and time of changes, record being changed, identification of person making the change and other information regarding the modifications. The logging data can be printed or otherwise output periodically, or at the request of an operator or administrator.

Figure 4:
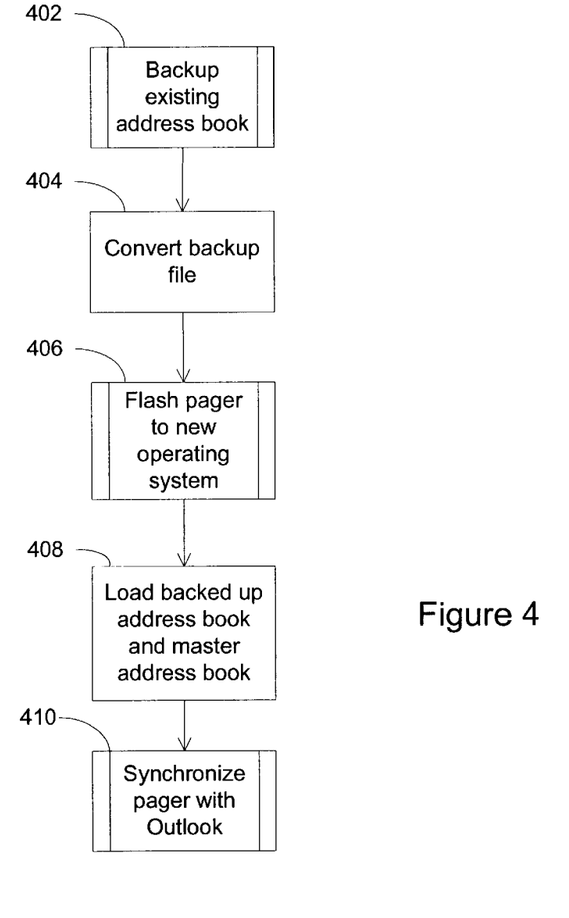
FIG. 4 is a flow chart of a method for converting an address book from an interactive pager using an old operating system to an interactive pager that uses an operating system that is compatible with a personal information manager according to an embodiment of the present invention.

A method for converting an address book from an interactive pager using an old operating system to an interactive pager that uses an operating system that is compatible with a personal information manager is illustrated in the flow chart of FIG. 4. In step 402, the address book of the interactive pager using the old operating system is backed up. In one embodiment, this backup is performed by downloading the address book to an address book information file on a computer disk. The download is performed using backup software provided by the interactive pager manufacturer. In step 404, the address book information file is converted to a user database using a conversion tool, such as conversion tool 408 described above. The user database adheres to a format that is convertible with a target personal information manager. In step 406, the pager is flashed to the operating system used by the target personal information manager. This step is essentially an in-place substitution of the old operating system of the interactive pager to the operating system compatible with the target personal information manager. In step 408, the user database is merged with a corporate database. The merged data is stored in a contacts list database that is accessible by the target personal information manager. In step 410, the interactive pager is synchronized with the contacts list database. In one embodiment, the synchronization is performed by uploading the information in the contacts list database to the interactive pager. This can be done using software provided by the interactive pager manufacturer.

Figure 5:
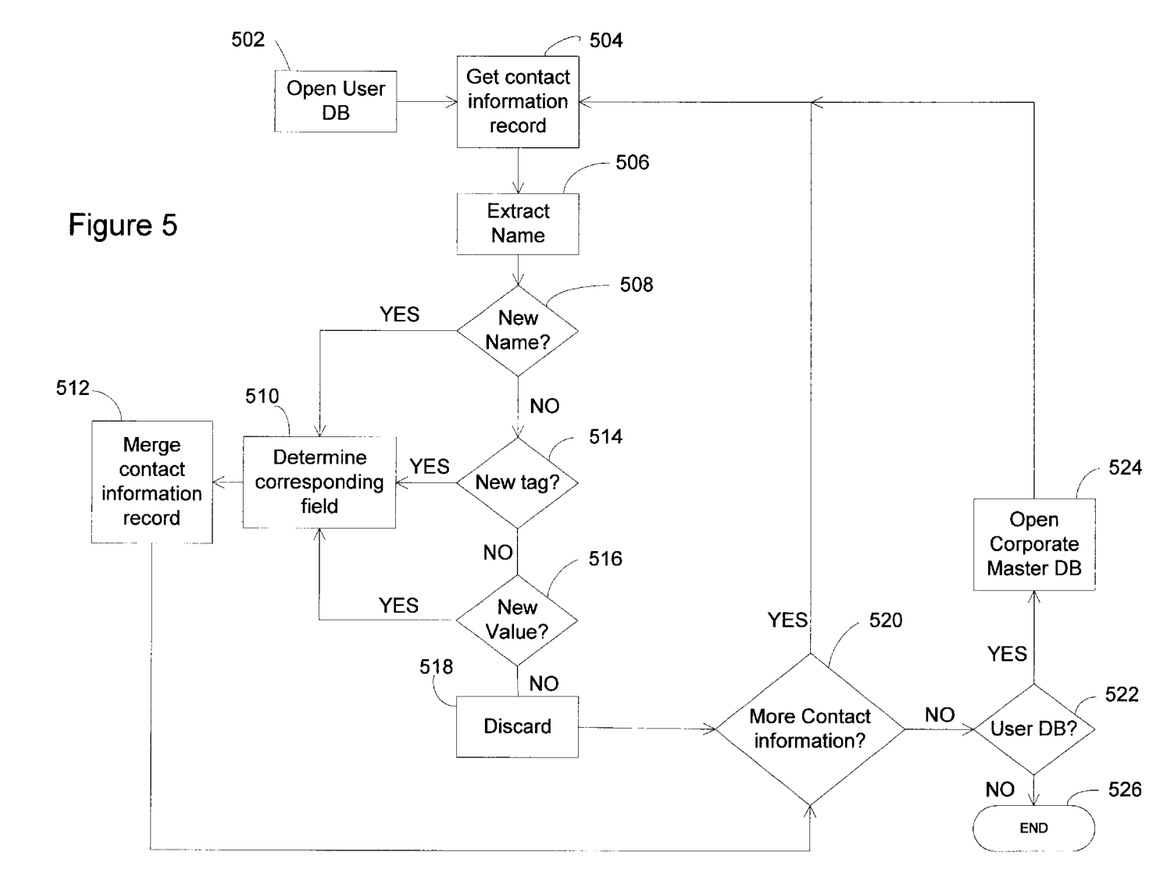
FIG. 5 is a flow chart illustrating an embodiment for operation of conversion tool according to an embodiment of the present invention.

FIG. 5 is a flow chart illustrating an embodiment for operation of conversion tool 108. It is assumed that a user database 110 has been created, for example, by downloading the address book from an interactive pager executing the old operating system. Further there is a new or existing contacts list database that is accessible and compatible with a target personal information manager. In step 502, the user database is opened. In step 504, an information contact record is obtained. The name of the contact is extracted from the contact information record in step 506. If the name is new, the method continues in step 510 where it determines the field of the target personal information manager corresponding to the tag of the confidential information. The process merges the contact information into the contacts list database in step 512. In this case the process adds the contact information since there was no prior contact information corresponding to the name.

If the name is not new, the process continues in step 514. In step 514, the process determines whether this is a new tag (i.e., new field) for the name. If the tag is new, the method continues in step 510 where it determines the field of the target personal information manager corresponding to the tag of the confidential information. The process merges the contact information into the contacts list database in step 512.

If the tag is not new, the process continues in step 516. In step 516, the process determines whether this is a new value for an existing field in an existing name. If the value is new, the method continues in step 510 where it determines the field of the target personal information manager corresponding to the tag of the confidential information. The process merges the contact information into the contacts list database in step 512. If inconsistent records are to be replaced, this is performed in merge step 512, where merge step 512 replaces the contact information record with the same name and tag information with the contact record having the same name and tag, but new value. If the value is not new the contact information record is a duplicate contact information record and it is discarded in step 518.

After data is merged or a contact record is discarded as a duplicate, the process continues in step 520 where is determines if there are more contact information records to process. If there are, the process continues in step 504 with the next contact information record to process. If there are not, the process continues in step 522 where the process determines whether it was operating on the user database or the corporate master database. This determination can be made by using status flags in a well-known manner. For example, a status flag can be set to true if the process is operating on the user database and set to false when it is operating on the corporate master database. If the process was operating on the user database, the process opens the corporate master database in step 524 to process its contact information records. This is the second pass of the two-step process described above. If the process determines that is was operating on the corporate master database in step 522, it terminates in step 530 indicating that all of the contact information records in both the user database and the corporate master database have been processed.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for enabling a user to load user contact information in an address book stored in a first interactive pager into a second interactive pager into a second interactive pager via a target personal information manager, wherein a first operating system of the first interactive pager is not compatible with the personal information manager and a second operating system of the second interactive pager, and wherein the second interactive pager is compatible with the personal information manager, comprising:

a computer having a computer disk on which the address book is downloaded from the first interactive pager to an address book information file, wherein the address book information file is not compatible with the target personal information manager stored on the computer a conversion tool (i) for converting all of the user contact information from the address book downloaded to the address book information file and (ii) for storing converted user contact information representing all of the user contact information after conversion in a user database, wherein the converted user contact information stored in the user database is in a format compatible with the target personal information manager;

a corporate master database comprising corporate contact information in communication with the computer;

a merge contact lists processor to merge the converted user contact information in the user database with the corporate contact information in the corporate master database and to store merged contact information in a personal information manager contacts list database; and uploading software for uploading the merged contact information in the personal information manager contacts list database to the second interactive pager that is compatible with the target personal information manager.

2. The system recited in claim 1, wherein the user contact information comprises a plurality of name-tag-value data records.

3. The system recited in claim 1, wherein the converted user contact information comprises a plurality of contact information records, and wherein the conversion tool comprises means for analyzing a tag associated with each contact record to determine a corresponding tag in the target personal information manager and means for storing the each contact record in the personal information manager contacts list database according to its corresponding tag in the target personal information manager.

4. The system recited in claim 1, wherein the conversion tool further comprises means for removing redundant contact information.

5. The system recited in claim 1, wherein the conversion tool further comprises means for removing inconsistent contact information.

6. The system recited in claim 1, wherein the address book information file is a .LFA file.

7. A method for enabling a user to load user contact information in an address book stored in a first interactive pager to a second interactive pager via a target personal information manager, wherein a first operating system of the first interactive pager is not compatible with the personal information manager and a second operating system of the second interactive pager, and wherein the second interactive pager is compatible with the personal information manager, comprising the steps of:
- backing up the address book in the first interactive pager to an address book information file, wherein the address book information file is not compatible with the target personal information manager;
- converting (i) all of the user contact information of the address book downloaded to the address book information file and (ii) storing converted user contact information representing all of the user contact information after conversion to a user database, wherein the converted user contact information stored in the user database having a format compatible with the personal information manager;
- merging the converted user contact information stored in the user database with corporate contact information stored in a corporate master database having a format compatible with the personal information manager, and storing merged contact information into a personal information manager contacts list database; and
- uploading the merged contact information stored in the personal information manager contacts list database to the a second interactive pager executing an operating system that is compatible with the personal information manager.

8. The method recited in claim 7, further comprising the steps of:
- flashing the first interactive pager that is not compatible with the personal information system with an operating system that is compatible with the personal information manager; and
- uploading the merged contact information in the personal information manager contacts list database to the first interactive pager that has been flashed.

9. The method recited in claim 7, further comprising the steps of:
- extracting a contact information record from the address book information file;
- determining a field in the personal information manager corresponding to a tag in the contact information record; and
- storing the information in the contact information record in the personal information manager contacts list database in accordance with the determined field.

10. The method recited in claim 7, wherein the backing up step comprises the step of creating a .LFA file.

11. The method recited in claim 7, wherein the merging step comprises the step of removing redundant contact information records.

12. The method recited in claim 11, wherein the removing step determines that a contact record is redundant if it contains the same name, tag and value information as a prior contact information record.

13. The method recited in claim 7, wherein the merging step comprises the step of removing inconsistent information.

14. The method recited in claim 13, further comprising the step of giving precedence to contact record information in the corporate master database.

15. A system for enabling; a user to load user contact information in an address book stored in a first interactive pager to a second interactive pager via a target personal information, wherein a first operating system of the first interactive pager is not compatible with the personal information manager and a second operating system of the second interactive pager, and wherein the second interactive pager is compatible with the personal information manager, comprising:
- means for downloading the user contact information from the address book to a computer disk to be stored as an address book information file, wherein the address book information file is not compatible with the target personal information manager;
- means for converting all of the user contact information of the address book downloaded to the address book information file and storing converted user contact information representing all of the user contact information after conversion to a user database that is compatible with the target personal information manager, wherein the converted user contact information stored in the user database is in a format compatible with the target personal information manger and contains a plurality of user contact information records;
- means for creating a corporate master database containing a plurality of corporate contact information records;
- means for merging the converted user contact information in the user database and the plurality of corporate contact information records in the corporate master database and storing merged contact information into a personal information contacts list database that is accessible to the target personal information manager; and
- means for uploading the merged contact information stored in the personal information contacts list database to the a second interactive pager executing an operating system that is compatible with the target, personal information manager.

16. The system recited in claim 15, further comprising, means for flashing the first interactive pager with an operating system that is compatible with the target personal information manager so that the first interactive pager is capable of executing the operating system that is compatible with the target personal information manager, and means for uploading the personal information contacts list to the first interactive pager.

17. The system recited in claim 15, further comprising means for removing redundant user contact information records.

18. The system recited in claim 15, further comprising means for removing inconsistent user contact information records.

19. The system recited in claim 15, where there is no pre-existing personal information manager contacts list database, comprising means for creating the personal information manager contacts list database.

20. A computer program product for causing a computer to load user contact information in an address book stored in a first interactive pager into a second interactive pager via a target personal information manager, wherein a first operating system of the first interactive pager is not compatible with the personal information manager and a second operating system of the second interactive pager, and wherein the second interactive pager is compatible with the personal information manager, comprising:

computer programmable code means for causing the computer to download the user contact information of the address book to a computer disk to be stored as an address book information file wherein the address book information file is not compatible with the target personal information manager;

computer programmable code means for causing the computer to convert all of the user contact information from the address book downloaded to the address book information file and storing converted user contact information to a user database that is compatible with the personal information manager, wherein the converted user contact information stored in the user database is compatible with the target personal information manager and contains a plurality of user contact information records;

computer programmable code means for causing the computer to create a corporate master database containing a plurality of corporate contact information records;

computer programmable code means for causing the computer to merge the converted user contact information in the user database and the plurality of corporate contact information records in the corporate master database, and storing merged contact information into the personal information contacts list database that is accessible by to the target personal information manager; and computer programmable code means for causing the computer to upload the merged contact information stored in the personal information contacts list database to the a second interactive pager executes an operating system that is compatible with the target personal information manager.

21. The computer program product recited in claim 20, further comprising computer programmable code means for causing the computer to flash the first interactive pager with an operating system that is compatible with the target personal information manager so that the first interactive pager is capable of executing the an operating system that is compatible with the personal information manager and computer programmable code means for uploading the personal information contacts list database to the first interactive pager.

22. The computer program product recited in claim 20, further comprising computer programmable code means for causing the computer to remove redundant user contact information records.

23. The computer program product recited in claim 20, further comprising computer programmable code means for causing the computer to remove inconsistent user contact information records.

24. The computer program product recited in claim 20, where there is no preexisting personal information manager contacts list database, comprising computer programmable code means for causing the computer to create the personal information manager contacts list database.

25. A method for loading user contact information stored in an address book stored in a first interactive pager via a target personal information manager, wherein a first operating system of the first interactive pager is not compatible with the personal information manager and a second operating system of the second interactive pager, and wherein the second interactive pager is compatible with the personal information manager, comprising the steps of:

downloading the user contact information of the address book to a computer disk as an address book information file, wherein the address book information file is not compatible with the target personal information manager stored on the computer;

converting all of the user contact information of the address book downloaded to the address book information book file and storing converted user contact information to a user database that is compatible with the personal information manager;

merging the converted user contact information of the user database with corporate contact information stored in a corporate master database and storing merged contact information into a personal information manager contacts list; and uploading the merged contact information stored in the personal information manager contacts list to the a second interactive pager that is compatible with the target personal information manager.

26. The method recited in claim 25, wherein the merging step comprises the step of removing redundant contact information.

27. The method recited in claim 25, wherein the merging step comprises the step of removing inconsistent contact information.

28. The method recited in claim 25, wherein the converting step comprises the step of determining a field in the personal information manager corresponding to each record of contact information in the address book information file.

29. The method recited in claim 28, further comprising the steps of: creating a mapping table of mappings of fields: from the address book information file to fields in the personal information manager; and referring to the table to performing the determining step.

30. A system for enabling a user to load user contact information in an address book stored in a first communications device to a second communications device via a target personal information manager, wherein a first operating system of the first communications device is not compatible with the personal information manager and a second operating system of the second communications device, and wherein the second communications device is compatible with the personal information manager, wherein the first and second communications devices are the same type of communication device, comprising:

a computer for downloading the address book from the first communication device to an address book information file wherein the address book information file is not compatible with the target personal information manager stored on the computer;

a conversion tool (i) for converting all of the user contact information from the address book downloaded to the address book information file and (ii) for storing converted user contact information representing all of the user contact information after conversion in a user database, wherein the converted user contact information stored in the user database is in a format compatible with the target personal information manager;

a corporate master database comprising corporate contact information in communication with the computer;

a merge contact lists process to merge the converted user contact information in the user database with the corporate contact information in the corporate master database and store merged contact information in a personal information manager contacts list database; and uploading software for uploading the merged contact information stored in the personal information manager contacts list database to the a second communications device compatible with the target personal information manager.

31. The system recited in claim 30, wherein the user contact information comprises a plurality of name-tag-value data records.

32. The system recited m claim 30, wherein the converted user contact information comprises a plurality of contact information records, and wherein the conversion tool comprises means for analyzing a tag associated with each contact record to determine a corresponding tag in the target personal information manager and means for storing the each contact record in the personal information manager contacts list database according to its corresponding tag in the target personal information manager.

33. The system recited in claim 30, wherein the conversion tool further comprises means for removing redundant contact information.

34. The system recited in claim 30, wherein the conversion tool further comprises means for removing inconsistent contact information.

35. The system recited in claim 30, wherein the address book information file is a .LFA file.

* * * * *